(12) United States Patent
Bergman et al.

(10) Patent No.: US 7,801,835 B2
(45) Date of Patent: Sep. 21, 2010

(54) METHOD FOR CONSTRUCTING AUTONOMIC ADVISORS AND LEARNING PROCEDURAL KNOWLEDGE FROM SCORED EXAMPLES

(75) Inventors: Lawrence Bergman, Mt. Kisco, NY (US); Vittorio Castelli, Croton-on-Hudson, NY (US); Prabhakar N. Kudva, New York, NY (US); Tessa A. Lau, New York, NY (US); Daniel A. Oblinger, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 652 days.

(21) Appl. No.: 11/152,381

(22) Filed: Jun. 15, 2005

(65) Prior Publication Data
US 2007/0005539 A1    Jan. 4, 2007

(51) Int. Cl.
*G06N 5/00* (2006.01)
(52) U.S. Cl. .......................... 706/12; 706/45
(58) Field of Classification Search .............. 703/22; 706/12; 716/11; 717/104; 326/38; 713/600
See application file for complete search history.

(56) References Cited

U.S. PATENT DOCUMENTS

| | | | | |
|---|---|---|---|---|
| 5,258,919 A | * | 11/1993 | Yamanouchi et al. | 716/11 |
| 6,182,024 B1 | * | 1/2001 | Gangopadhyay et al. | 703/22 |
| 6,505,342 B1 | * | 1/2003 | Hartmann et al. | 717/104 |
| 7,284,144 B2 | * | 10/2007 | Surico | 713/600 |
| 7,352,205 B2 | * | 4/2008 | Siemers et al. | 326/38 |

OTHER PUBLICATIONS

Derderian, et al, Generating Feasible Input Sequences for Extended Finite State Machines (EFSMs) using Genetic Algorithms, GECCO, Jun. 25-29, 2005, pp. 1081-1082.*
Horihan, et al, Improving FSM Evolution with Progressive Fitness Functions, GLSVLSI'04, Apr. 26-28, 2004, pp. 123-126.*
Amaral, et al, Designing Genetic Algorithms for the State Assignment Problem, IEEE Transactions on Systems Man and Cybernetics, vol. 25, No. 4, Apr. 1995, pp. 100-108.*
Jim, et al., How Communications Can Improve the Performance of Multi-agent Systems, Proceedings of the Fifth International Conference on Autonomous Agents, 2001, Montreal, Quebec, Canada, pp. 584-591.*

* cited by examiner

*Primary Examiner*—Wilbert L Starks, Jr.
(74) *Attorney, Agent, or Firm*—McGinn IP Law Group PLLC (57) ABSTRACT

A system for and method of constructing an executable reusable procedure which includes determining an executable procedure from at least one scored trace of a procedure execution.

20 Claims, 7 Drawing Sheets

METHOD FOR CONSTRUCTING AUTONOMIC ADVISORS AND LEARNING PROCEDURAL KNOWLEDGE FROM SCORED EXAMPLES

CROSS-REFERENCE TO RELATED APPLICATIONS

This application is related to the following U.S. Patent Applications:

Ser. No. 10/630,959, entitled "SYSTEMS AND METHODS FOR GENERATING AND DISTRIBUTING EXECUTABLE PROCEDURES FOR TECHNICAL DESK-SIDE SUPPORT" and filed on Jul. 30, 2003;

Ser. No. 10/729,736, entitled "ALIGNMENT AND GENERALIZATION OF DEMONSTRATED PROCEDURE TRACES" and filed on Dec. 5, 2003;

Ser. No. 10/972,028, entitled "METHOD FOR INDUCING A HIDDEN MARKOV MODEL LEARNING WITH A SIMILARITY METRIC" and filed Oct. 22, 2004.

BACKGROUND OF THE INVENTION

1. Field of the Invention

The present invention generally relates to a method and apparatus for constructing autonomic advisors, and more particularly to a method and apparatus for constructing computer-executable procedures using scored sequences of examples.

2. Description of the Related Art

Consider the problem of automatically constructing a model of a procedure using sequences of examples.

For purposes of the present application, the term "procedure" refers to a structured task having a definable goal, and that can be automated to a point where the required user intervention or input is limited. Examples of procedures include installing an application on a computer system, managing payroll, troubleshooting a network card, driving a car while following directions, etc.

Activities such as writing a novel or preparing a patent application are not procedures in the sense of this patent because the intrinsic variability of the task requires too many user decisions to be effectively automated. One of ordinary skill in the art would recognize the difference between this definition of "procedure" and the definition of "procedure" commonly used in the Computer Science field, where the term is synonymous of "routine", "subroutine", and sometimes "function", namely, a section of a program that performs a specific task (without necessarily returning a result).

For purposes of the present application, the term "model" refers to an executable description of the procedure, namely, to an entity that can provide a human-readable description of the procedure and that can be automatically executed on behalf of or in cooperation with the user.

There are two main approaches to constructing executable models: programming, and induction from examples.

Programming tools exist to automate specific types of procedures: for example, the Microsoft® Windows® Installer SDK provides tools for automating the installation of application programs on computers running the Microsoft® Windows® operating systems. Similarly, workflow management systems are tools that facilitate the automation of business processes (or "workflows"). Finally, tools from Artificial Intelligence, such as Expert Systems (e.g., see Peter Jackson, Introduction to Expert Systems, Addison Wesley, 2004), can be manually programmed to produce a model of the task.

A second main approach is programming by example (e.g., as disclosed by Henry Lieberman, Your Wish is My Command: Programming by Example, Morgan Kaufmann, 2001), also known as programming by demonstration (PBD).

A PBD system is an inference engine that takes as input a set of input-output pairs describing the desired behavior of a program, and produces a program whose behavior is consistent with the set of input-output pairs. PBD has been adapted to capturing procedural knowledge, as taught, for example, by Lau, et al. (e.g., see Tessa Lau, Pedro Domingos, and Daniel S. Weld, "Learning programs from traces using version space algebra," in Proc. Intern. Conf. on Knowledge capture, pp. 36-43, 2003), by constructing PBD systems that produce programs from a set of sequences of input-output pairs.

Here, each sequence of input-output pairs describes an execution of a procedure by a user. Since the model produced by the system is a model of the procedure from the viewpoint of the user, each input-output pair in a sequence describes a specific interaction between the user and the applications used to perform the procedure.

More specifically, the input in the input-output pair is a description of what the user sees on the screen and the output is a description of the user action.

The methods taught by Lau, et al., and by Lieberman have one of several limitations including that they require the user to make correspondences between analogous steps in different sequences, or they can learn from individual sequences.

Co-pending U.S. patent application Ser. No. 10/729,736, by Daniel Oblinger, Vittorio Castelli, Tessa Lau, and Lawrence Bergman, entitled "Alignment and generalization of demonstrated procedure traces") teaches a method for capturing procedural knowledge by demonstration from multiple sequences of input-output pairs by simultaneous alignment and generalization of the demonstrated traces.

Co-pending U.S. patent application Ser. No. 10/972,028, by Daniel Oblinger, Vittorio Castelli, Tessa Lau, and Lawrence Bergman, entitled "Method for Inducing a Hidden Markov Model Learning With A Similarity Metric", teaches a method for improving the efficiency of inducing Hidden Markov Models (e.g., see Y. Bengio and P. Frasconi, "Input-Output HMM's for Sequence Processing," IEEE Trans. Neural Networks, 7(5):1231-1249, September 1996).

Hidden Markov Models can be used as the induction engine in an embodiment of the above mentioned U.S. patent application Ser. No. 10/729,736, Daniel Oblinger, Vittorio Castelli, Tessa Lau, and Lawrence Bergman, "Alignment and generalization of demonstrated procedure traces".

Finally, other tools from Artificial Intelligence, such as Bayesian Networks (e.g., see David Heckerman, "A tutorial on learning Bayesian Networks", Microsoft Technical Report MSR-TR-95-06, 1995), can be manually built by identifying relevant parameters and variables of the task, and automatically inducing the relations between said parameters from examples or manually constructing said relations.

Unlike the PBD approach, the skeleton of the model is manually constructed, and from the viewpoint of the current patent application, these tools are considered in the same category of programming tools.

Procedure models can be constructed for different application areas. Co-pending U.S. patent application Ser. No. 10/630,959, by Tessa Lau, Vittorio Castelli, Lawrence Bergman, and Daniel Oblinger, entitled "Systems and methods for generating and distributing executable procedures for technical desk-side support" teaches how to construct procedure models using PBD techniques for deskside support.

Procedure models can be used to guide, assist, or replace a user in repetitive tasks involving a single application, as taught in the above-mentioned Tessa Lau, et al., or multiple applications.

Procedure models can also be used for automation purposes, for example in robotic tasks where the robot can learn from previous experience, in control systems for plants, and in autonomic computing as described in IBM System Journal, issue on Autonomic Computing, vol. 42, nr. 1, 2003, available at http://researchweb.watson.ibm.com/journal/sj42-1.html where computer systems are self-regulating thanks to a variety of hardware and software mechanisms.

The software mechanisms, henceforth referred to as "autonomic agents", perform tasks related to self-regulation, self-optimization, self-healing, and self-protection of the computer systems.

According to the present definition, autonomic agents actually perform procedures. Due to the complexity of computer systems, effective autonomic agents can be difficult to build using traditional programming techniques; learning behavior from previous experience is likely a necessary component to the construction of such agents.

Traditional techniques for learning procedural knowledge from demonstration, taught in the above-mentioned conventional methods, can be divided into two broad categories: approaches that produce deterministic models of a procedure, and approaches that produce probabilistic models of a procedure. In general, one having ordinary skill in the art would appreciate that probabilistic models subsume deterministic models as a special case.

All the methods for learning procedural knowledge from demonstrations taught in the art assume that the examples provided by the user are "good" examples, namely, examples of successful executions of the procedure.

Specific uses of both positive and negative examples are taught, for example, in Robert C. Miller and Brad A. Myers. "LAPIS: Smart Editing With Text Structure." Extended abstract for *CHI* 2002 *formal demonstration, Minneapolis, Minn., April* 2002, where they are used to learn patterns, in Tessa A. Lau and Daniel S. Weld, "Programming by Demonstration, And Inductive Learning Formulation", Proc 1999 ACM Int. Conf. Intelligent User Interfaces, where they are used to operate on version spaces (namely, to refine a set of hypotheses or to enlarge a set of hypotheses), and in Maulsby D. and Witten I. H, "Learning agents: from user study to implementation," IEEE Computer 30(11), pp 36-44, 1997, where positive examples are predictions of the system that the user accepts, and negative examples are predictions of the system that the user rejects, and positive and negative examples are used to interactively induce individual predictive steps. One of ordinary skill in the art would appreciate the similarity of the approaches taught in Robert C. Miller and Brad A. Myers. "LAPIS: Smart Editing With Text Structure." Extended abstract for *CHI* 2002 *formal demonstration, Minneapolis, Minn., April* 2002 and Tessa A. Lau and Daniel S. Weld, "Programming by Demonstration, And Inductive Learning Formulation", Proc 1999 ACM Int. Conf. Intelligent User Interfaces.

A limitation of the conventional approaches is the use of positive and negative examples to induce individual steps of the procedure.

The conventional methods are limited to positive, or to positive and negative examples. In general, the distinction between positive and negative examples is not sufficient.

As an illustrative example, consider the case of an expert performing an action (or a sequence of actions) during a system administration procedure, for example aimed at reducing the response time of an on-line computer system. Here, it would be possible to measure the effectiveness of the system administrator action, for example, in terms of reduction of response time. Different actions have in general different effects and result in different reductions of response time (and potentially, in an increase in response time).

A distinction between positive and negative actions based on whether actions decrease or increase the response time is clearly too coarse to be useful: an action A that slightly reduces the response time is labeled as "positive", while an action B that slightly increases the response time is labeled as "negative", although it is essentially equivalent to action A. More disturbingly, an action C that substantially reduces the response time is labeled "positive" just like action A, although C is clearly to be preferred.

In general, there is a need for a method for learning procedural knowledge from scored demonstrations, where individual steps, subsequences, and sequences have associated scores.

Finally, consider the case of an autonomic agent that implements a policy (e.g., that tries to match a set of requirements). Depending on the desired policy, one would score differently the same sequence of input-output pairs.

The conventional methods to induce an autonomic agent for a specific policy consist of providing a collection of positive and potentially negative examples for the policy. This process is onerous and expensive.

Thus, hitherto the present invention, there has been no efficient and effective approach, which would allow a user to provide a scoring function adapted to the specific policy, score existing recorded sequences of input-output pairs, and induce an agent from the scored sequences.

Hence, the conventional methods have not been able to reuse existing sequences to infer new policies, thus reducing the need for new sets of examples to be used in the inference.

Additionally, the conventional methods have not been adaptive. That is, the agent has not been able to learn from its own experience and thus the agent has not been able to score its actions by using the scoring function, and then update its model of the procedure accordingly.

SUMMARY OF THE INVENTION

In view of the foregoing and other exemplary problems, drawbacks, and disadvantages of the conventional methods and structures, an exemplary feature of the present invention is to provide a method and structure for constructing autonomic advisors.

Another exemplary feature is to provide a method and apparatus for constructing computer-executable procedures using scored sequences of examples.

In a first aspect of the present invention, a method of constructing an executable reusable procedure, includes determining an executable procedure from at least one scored trace of a procedure execution.

In another exemplary aspect of the invention, the executable procedure selectively favors actions with a higher score.

According to another exemplary aspect of the invention, the method obtains the at least one scored trace of the procedure execution. The step of obtaining the at least one scored trace can include automatically observing a procedure execution and/or one instance of a procedure execution. The automatically observing can be performed prior to the automatically aligning the observed executions of procedures. The automatically aligning the observed executions of procedures also can be performed prior to the automatically producing executable procedure.

In other exemplary aspects of the invention, the automatically observing the at least one procedure execution can include automatically observing at least one expert executing instances of the procedure execution and providing each expert of the at least one expert with means for annotating individual steps of the instance of the procedure execution.

In yet another exemplary aspect of the invention, the step of obtaining can include recording at least one trace and scoring the at least one trace based on a scoring function to determine the at least one scored trace.

A library of a plurality of reusable procedures also can be created.

In other exemplary aspects of the invention, the step of determining can include inducing a model from the at least one scored trace. The model can include, for example, a stochastic finite-state Mealy machine model. The step of inducing the model can include an initialization phase including computing an initial alignment and an initial generalization of the at least one trace, computing a transition model based on the initial alignment, and computing an action model for the initial alignment.

In another exemplary aspect of the invention, the step of inducing the model can include inducing a best alignment for a given generalization and a best generalization for a given alignment. The step of inducing a best generalization for a given alignment can include computing a transition model based on the given alignment, computing an action model for the given alignment, and evaluating a capability of the best alignment and the best generalization to produce at least one action with a predetermined high score. In a preferred aspect of the invention, the transition model selectively favors transitions with a higher score and the action model selectively favors actions with a higher score.

According to the exemplary aspects of the invention, the computing the action model can include, for each state, partitioning aligned input-output pairs by output into groups, and for each group, constructing a regression model of a score on inputs using scored input-output pairs.

The exemplary aspects of the invention can further include initializing the executable procedure, predicting a next action based on the executable procedure, executing the predicted next action, evaluating an effect of the next action by observing a new input after the next action is executed, and determining whether to terminate the executable procedure based on the evaluation.

In another exemplary aspect of the invention, the method can further include initializing the executable procedure, predicting a next action based on the executable procedure, estimating a score for the next action, if the score is higher than a predetermined threshold, executing the next action, if the score is not higher than the predetermined threshold, soliciting a user to select a user selected action and executing the user selected action, evaluating an effect of the one of the next action and the user selected action by observing a new input after the one of the next action and the user selected action is executed, and determining whether to terminate the executable procedure based on the evaluation. The step of soliciting the user to select the user selected action can include providing the user with information on at least one of a current state of a system, actions previously performed, and predicted actions, and asking the user to select the user selected action.

In yet another exemplary aspect of the invention, the method can further include monitoring a status of a system executing the executable procedure, selecting an action and executing the selected action, observing at least one effect of the executed action on the system, scoring the action based on a user-specified scoring function, modifying the procedure model based on at least one scored action, determining whether to modify the procedure model based on a recent scored action, and inducing a new procedure model using at least a portion of available scored traces.

Another exemplary aspect of the invention is directed to a system for constructing an executable reusable procedure (for example, according to the exemplary method described above) which includes one or more of a determining unit that determines an executable procedure from at least one scored trace of a procedure execution, an obtaining unit that obtains the at least one scored trace of the procedure execution, an observing unit that automatically observes at least one of a procedure execution and at least one expert executing the procedure, an aligning unit that automatically aligns the observed executions of procedures, and means for annotating individual steps of at least one instance of the executable procedure.

In another exemplary aspect of the invention, a system for constructing an executable reusable procedure can include at least one scored trace of a procedure execution and means for determining an executable procedure from the at least one scored trace of the procedure execution.

The exemplary aspects of the present invention also can include a method for deploying computing infrastructure in which computer-readable code is integrated into a computing system, and combines with the computing system to perform the exemplary methods described above.

Moreover, the exemplary aspects of the present invention can include a signal-bearing medium tangibly embodying a program of machine-readable instructions executable by a digital processing apparatus to perform the exemplary methods described above.

Thus, the exemplary aspects of the present invention provide, for example, a system and method for automatically learning-by-demonstration procedural knowledge from scored traces.

The exemplary aspects of the present invention also provide a more efficient and effective approach over the conventional methods, which allows the user to provide a scoring function adapted to the specific policy, to score existing recorded sequences of input-output pairs, and to induce an agent from the scored sequences.

Thus, the exemplary aspects of the present invention advantageously reuse existing sequences to infer new policies, thus reducing the need for new sets of examples to be used in the inference.

Additionally, with the exemplary aspects of the present invention, the agent can learn from its own experience and by using the scoring function, the agent can score its actions, and update its model of the procedure accordingly.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Referring now to the drawings, and more particularly to FIGS. 1-8, there are shown exemplary embodiments of the method and structures according to the present invention.

The unique and unobvious features of the present invention are directed to a novel system and method for constructing autonomic advisors, and more particularly, to a method and apparatus for constructing computer-executable procedures using scored sequences of examples.

Exemplary Embodiment

Prior to discussing the exemplary embodiment, some terminology will be defined for purposes of the present application.

Procedure refers to a structured task having a definable goal, and that can be automated to a point where the required user intervention or input is limited.

Model and procedure model are used interchangeably to denote an executable description of a procedure, namely, to an entity that can provide a human-readable description of the procedure and that can be automatically executed on behalf of or in cooperation with the user to accomplish the task of the procedure.

Actor denotes an entity that interacts with a system. For example, a user interacting with an application, a control program interacting with a robotic mechanical system, and an autonomic agent interacting with a network of computer systems are actors.

Action denotes the finest granularity of interaction between an actor and a system. Actions can be defined at different levels of abstraction (for example, the interaction between a user and a computer via a keyboard can be described in terms of typed strings, or of individual key presses). It will become apparent to one of ordinary skill in the art that the present invention can be equally applied to embodiments that differ in the level of abstraction at which actions are defined. Therefore, for purposes of the present application, no assumption is made as to any specific choice of the abstraction level at which actions are defined.

Procedure step is the atomic element of a procedure, namely, a portion of a procedure that describes an individual action.

Input denotes the input to the model for a procedure step. In the case of traditional procedural knowledge, the input is a representation of what a user sees on the screen of the computer and knows about the process being executed at the time of the step. In the case of autonomic agents, input refers to a collection of measurements describing the state of the computer system. Since inputs describe the state of the system with which the actor (user, or autonomic agent) interacts, the input is also called state.

Output is the output of the model, namely, an executable description of an action to be taken. In the case of traditional procedural knowledge, the output describes a user action, namely, an interaction with one or more applications via an input device (e.g., keyboard or mouse). In the case of autonomic agents, an action is a collection of one or more commands sent to specific applications running on one or more computer systems.

Trace refers to a sequence of input-output pairs recorded during a single execution of a procedure. It is a description of the interaction between an actor and the acted-on system during the execution of a procedure.

Training set denotes a collection of traces used to induce a procedure model.

Test set denotes a collection of traces used to test the performance of an induced procedure model.

Learning denotes the process of inducing a model from a training set.

Learning algorithm is an algorithm that induces a model from a training set.

Scoring function is a term that refers to a function that takes as input one or more subsequent input-output pairs and produces a number called score. For purposes of the present application, the term score is used to denote an indicator of how well an action (output) or a sequence of actions cause progress towards a desired goal. For the purpose of the exemplary aspects of the present application, actions with a higher score are interpreted as being better than actions with a lower score. However, for purposes of the present application, specific requirements on the actual values of the scores are not required. Also, for purposes of the present application, it is not required, for example, that scores are positive, or that scores have a sign depending on whether the action caused an improvement or a deterioration of the situation. Further, the present application does not require specific semantics associated with the actual score values. For example, the present application does not require interpretations such as: if action A has double the score of action B, then action A is twice as good as action B.

For purposes of the exemplary aspects of the present application, the scores, as defined above, should not be confused with other quantities which generally may be called "scores" in the literature. These include, but are not limited to:

Membership functions in fuzzy logic: membership functions are used to assign an object to different categories in different degrees of membership. For example, consider a computer disk, and distinguish between two categories: empty and full. A disk with 70% utilization would be assigned a membership of 0.7 to the full category and 0.3 to the empty category. One can construct fuzzy actions, and one can assign scores to fuzzy actions, just as one can assign scores to traditional actions. Hence, the present invention can be extended to fuzzy actions.

Likelihoods and posterior probabilities: a probabilistic inference system (for example, as disclosed by Ser. No. 10/729,736, entitled "Alignment and Generalization of Demonstrated Procedure Traces" and filed on Dec. 5, 2003 produces probabilistic predictions of actions to be taken, namely, assigns to each possible action a number (properly called a posterior probability and sometimes called improperly a likelihood, or even worse, a likelihood score or a score) which is an estimate of how likely a user is to take said action under the present circumstances, namely, what fraction of the user population would take said action. The posterior probability therefore does not have any relation the "goodness" of the estimate towards a goal. Probabilities can also be associated with input-output pairs during the model induction: they can be used to specify how likely is a certain input-output pair in a specified condition. Again, these probabilities are conceptually different from the scores defined in the exemplary aspects of the present application and preferably should be treated differently. As with membership functions, the exemplary aspects of the present application relate to, for example, methods for associating both posterior probabilities and scores to outputs, and for learning from sequences of input-output pairs where both probabilities and scores are associated to pairs.

Confidence and confidence levels: sometimes called confidence scores, these quantities describe how confident is the model about the prediction. On occasion the term confidence is also used as a synonym of posterior probability or of a function of the posterior probability. One of ordinary skill in the art clearly would understand that these quantities have a different nature from the scores defined in the present application. The present application relates to, for example, methods for combining scores and confidence when making predictions.

Generalization: the process of explaining the differences between outputs in terms of differences between their inputs, and of being able to reasonably predict outputs from previously unseen inputs by exploiting similarities between said previously unseen inputs and previously seen inputs. The term is also used to denote the result of said process.

Figure 1:
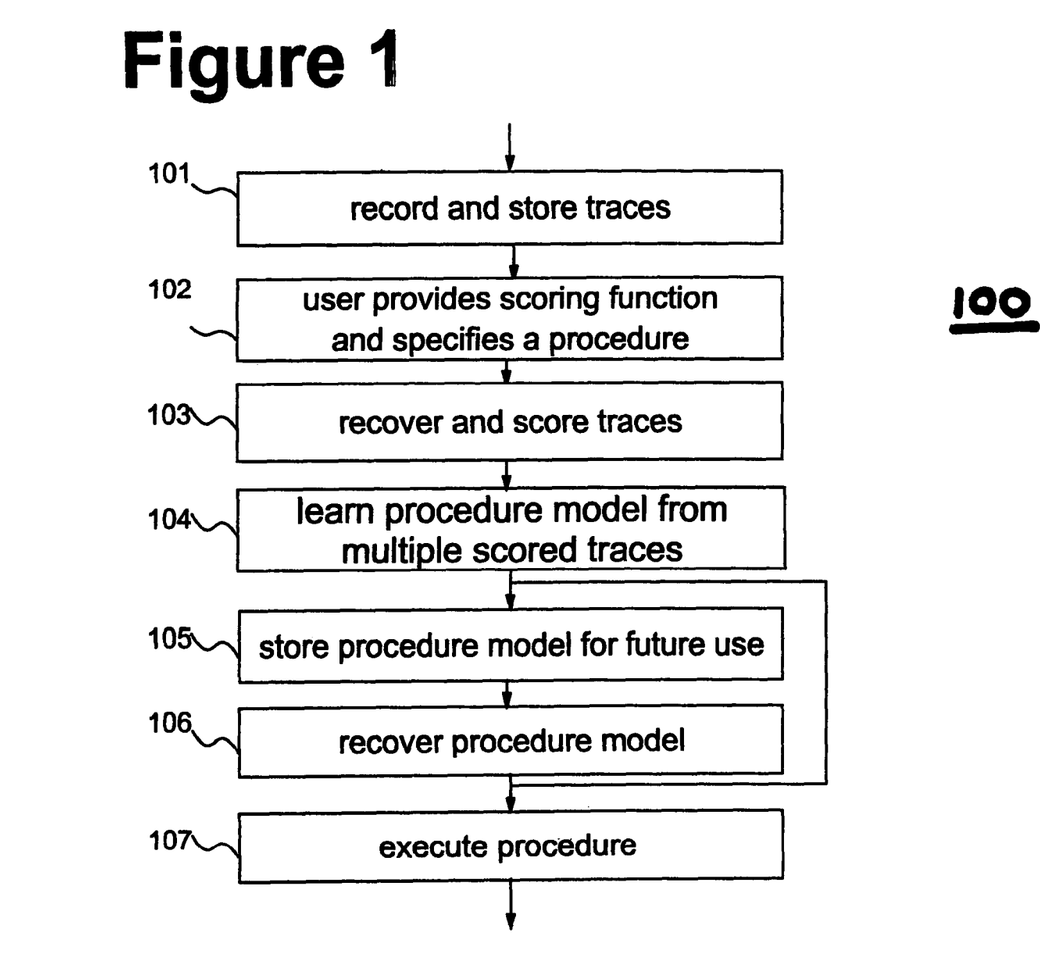
FIG. 1 shows an exemplary aspect of a method 100 for constructing executable and distributable procedures from examples and executing them.

Turning now to the Figures, FIG. 1 describes and illustrates an exemplary aspect of the present invention.

In step 101, traces are obtained by recording sequences of state-action pairs during executions of a procedure. Traces pertaining to the same procedure are stored in a fashion that allows them to be retrieved when a model of the procedure needs to be built. For example, traces can be stored in a database, or as files in a file system.

In Step 102, the user provides the system with a scoring function and specifies a procedure for which a model is to be constructed. In the spirit of the current invention, the user can specify a scoring function in the form of a program or a routine; by selecting it from a collection of scoring functions that are precoded into the system; or by other means. In general, there is no preferred scoring function: the user specifies or selects a scoring function that is specific to the domain and to the desired behavior of the system.

In Step 103, the traces pertaining to the procedure are retrieved in a fashion that depends on how they were stored (for example, if they were stored in a database, they would be retrieved by issuing an appropriate query to the database), and each trace is scored, for example as described later in FIG. 2.

One of ordinary skill in the art would appreciate that, in the spirit of the present invention, the user can specify whether the scoring function is to be retained and used to score newly recorded traces for the purpose of updating an existing model of the procedure. In this case, newly recorded traces can be scored before being stored as in Step 102 or used as in Step 104.

In Step 104, one or more scored traces, corresponding to different executions of the same procedure, are combined to produce a procedure model.

The procedure model can be immediately executed, as in Step 107.

Alternatively, the procedure model can be stored in a procedure repository for future use, as in Step 105. In this latter scenario, the actor retrieves the model in Step 106.

It would be apparent to one of ordinary skill in the art that the user that provides the scoring function need not be the same entity as the actor that retrieves the model in Step 106.

In particular, the user could be a system administrator that specifies a scoring function for a specific policy, and the actor could be an autonomic engine or agent that can execute procedure models to implement the policy.

In an exemplary embodiment, the Step 103 of scoring individual traces includes scoring individual steps.

In this embodiment, the scoring function has the form $f(x,y)$ where x is an input-output pair and y is the input of the input-output pair immediately following x. $f(x,y)$ assigns a score to x.

For example, consider the case of an autonomic agent. The input part $x_{input}$ of the input-output pair x is a description of the state of the computer system. The output part $x_{output}$ of the input-output pair x is an action that was taken as a result of the input in x and, in general, of the input-output pairs that precede x in the trace. y describes the state of the system as a result of the action in x. The scoring function $f(x,y)$ in this exemplary embodiment considers the changes in the state of the system that result from the execution of the action in x, and assigns it a score that describes how well the change in the state of the system is aligned with the goals of the procedure. One of ordinary skill would appreciate that functions that only take into account $x_{input}$ and y can be used in the spirit of the present invention. Said functions do not consider the specific action taken, but only consider the results. It would also be apparent to one of ordinary skill in the art that functions that take into account both $x_{input}$ and $x_{output}$ as well as y can be used in the spirit of the current invention. These functions would consider the specific action taken, in addition to the state before and after the action, to compute the score.

In a different embodiment, the scoring function takes into account the entire trace, and has the form $f(x,T)$, where x is an input-output pair and T is the trace to which x belongs. Here, the score associated by the scoring function to the input-output pair x (more specifically, to the action $x_{output}$) is a function of the entire trace. In an exemplary embodiment, this function partitions the trace T into parts pertaining to sub-procedures, or equivalently, to sub-tasks of the main task, and assigns a score to x that captures how well the action is aligned with the sub-task.

For example, the score can be a measure of the resources required to complete the task, such as the number of steps from x to the end of the sub-task. One of ordinary skill in the art would appreciate how the method can be extended to the case where the function is related to the overall goal of the procedure rather than a sub-task.

Finally, in another embodiment, the scoring function takes into account the entire training set, and has the form $f(x,T,R)$, where x is an input-output pair, T is the trace to which x belongs, and R is the training set to which the trace T belongs. The function $f(x,T,R)$ can, for example, assign a relative score to x, namely, a score that is computed by comparing the effect of x on the goal to the effects of analogous actions in the training set. Using the example above, where the function f measures the resources (or the cost of the resources) needed to complete the sub-task, in this embodiment $f(x,T,R)$ would compare the cost of the resources required to complete the sub-task to the cost of the resources required to complete the sub-task in other traces for steps that are alternatives to x.

One of ordinary skill in the art would appreciate that learning from scored examples is different from learning from positive and negative examples, because positive and negative examples are treated in the art as belonging to different classes, while here the score is not the class label, but rather an attribute of the class label.

If the data were not scored, Step 104 could be performed, for example, as taught in the co-pending patent application: "Alignment and generalization of demonstrated procedure traces". However, the mentioned patent application does not teach how to perform Step 104 when the actions in traces have an associated score. One of ordinary skill in the art would appreciate the difficulty of learning a model from scored traces. To illustrate this difficulty, we describe a simple example: let $x^1$ be the ith input-output pair from trace $T^1$, and let $x^2$ be the ith input-output pair from trace $T^2$. Assume that for each $j<i$, the jth input-output pair in $T^1$ is identical to the jth input-output pair in $T^2$. Call these pairs $x_1, \ldots, x_{i-1}$. Assume that $x^1_{input}$ is identical to $x^2_{input}$) that $x^1_{output}$ is different from $x^2_{output}$ and that the score of $x^1$ is higher than the score of $x^2$. In this case, it is natural to construct a model that, conditional on the fact that the input-output pairs $x^1, \ldots, x_{i-1}$ and the input x input are observed, predicts $x^1_{output}$ rather than $x^2_{output}$. In practice, however, this is a situation that occurs rarely. In reality, different traces contain input-output pairs that are different from each other, and the learning algorithm preferably should be able to produce a model that accounts for these differences and at the same time is able to produce meaningful predictions in the likely scenario in which previously unseen inputs are observed. One of ordinary skill in the art would appreciate that these two requirements are somewhat in contrast with each other.

In an exemplary aspect of the present application, a model is constructed for sequential input-output data using scored traces. To be efficient, a model preferably should account for the statistical dependence of the input-output pairs in the sequence. Consider, for example, the case of a deskside support person trying to fix a network connection. Assume that this person first runs a diagnostic program to determine whether the network card has a hardware problem. In general, this diagnostic program is run only once during the procedure. The model should capture this behavior and ensure that, if at a point during the execution of the procedure the diagnostic program is run, it is never run again during the same execution of the procedure. Hence, the predicted actions after the execution of the diagnostic program statistically depend on the action of executing the diagnostic program. There are numerous classes of models that account for dependence in sequential data. The exemplary aspects of the present application can use a particular class of such models. One of ordinary skill in the art would appreciate how to use other classes of models.

For illustrative purposes, the class of models considered in the exemplary aspects of the present application is that of the stochastic a finite-state Mealy machines.

Stochastic Mealy Machines

Some of the exemplary aspects of the present application rely on a particular class of models, known in the art, called Stochastic Mealy Machines. As one of ordinary skill in the art would know, a stochastic finite-state (input-output) Mealy machine is a quadruple $(S, \alpha, T, A, m_0)$, where S is a finite collection of states (where a state is an abstraction: practically, think of S as a collection of different integers);

$\alpha$ is the set of allowable actions $T=T(s, x_{input})$ is a transition model, namely, a function that takes as input a state s and an input $x_{input}$ and produces a probability distribution over S;

$A=A(s, x_{input})$ is an action model, namely, a function that takes as input a state s and an input $x_{input}$ and produces a probability distribution over $\alpha$ $\mu_0$ is the initial probability distribution over S.

To produce predictions, the model at each point in time, say t, maintains a probability distribution $\mu_t$ over S:

The initial value of this probability distribution is set to $\mu_0$.

At time t (t=1, 2, etc.) the input $x^{(t)}_{input}$ is observed.

The model updates $\mu_t$ using the equations $$v_t^j = T(j, x^{(t)}_{input})$$

$$\mu_t(i) = \Sigma_{j \in S} \mu_{t-1}(j) v_t^j(i)$$

Where $v_t^j$ is the conditional distribution over S given that the state at time t−1 is j and the observed input at time t is $x^{(t)}_{input}$; $v_t^j(i)$ is the probability assignees to state i by $v_t^j$; and the sum is over the states in S.

The model then produces a prediction by producing a probability distribution over the actions using the equations $$\zeta_t^j = A(j, x^{(t)}_{input})$$

$$\zeta_t(a) = \Sigma_{j \in S} \zeta_t^j(a) \mu_t(j)$$

and selecting the action a that maximizes $\zeta_t(a)$.

A specific example of stochastic Mealy machine is the Input-Output Hidden Markov Model (IOHMM) taught by Y. Bengio et al. in the article mentioned above (Y. Bengio and P. Frasconi, "Input-Output HMM's for Sequence Processing", IEEE Trans. Neural Networks, 7(5):1231-1249, September 1996). The Baum-Welch algorithm is used to find a procedure model (i.e., a set of transition and output functions) for which the log-likelihood of the training data is maximized.

Briefly, it is recalled how the traditional Baum-Welch algorithm works for the IOHMM as taught in Y. Bengio et al. (Y. Bengio and P. Frasconi, "Input-Output HMM's for Sequence Processing", IEEE Trans. Neural Networks, 7(5):1231-1249, September 1996).

First, the algorithm is initialized, usually using a randomized initialization strategy that produces an initial alignment of the traces, namely, a probability distribution over the states for each of the input-output pair in each sequence. Using the trace alignment, the algorithm constructs a transition classifier for each node of the IOHMM and an action classifier for each node of the IOHMM.

More specifically, if a trace has probability $p_t(n)$ of being in node n at time t, and the state-action pair at time t is (s,a), the training set of the action classifier for node n contains the state-action pair (s,a) with weight $p_t(n)$. The transition classifier is constructed in a similar fashion, by taking into account the alignments of adjacent input-output pairs.

Figure 2:
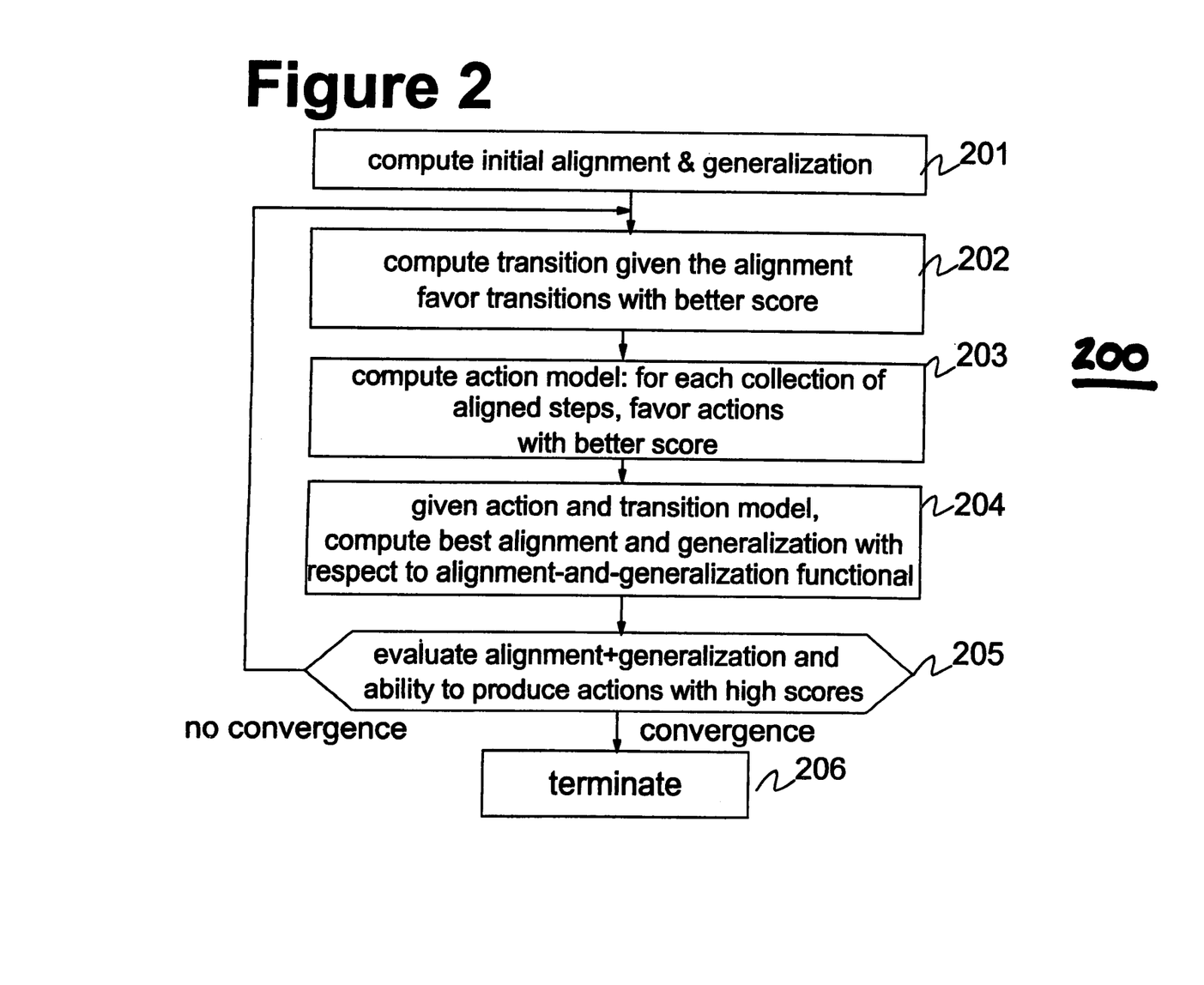
FIG. 2 teaches an exemplary method 200 for inducing the executable and distributable procedure models from a collection of traces.

Turning again to the Figures, FIG. 2 exemplarily shows a preferred aspect of a method for constructing a stochastic Mealy machine from scored traces using simultaneous alignment and generalization.

The procedure model is constructed by iteratively optimizing a function that captures the goodness of alignment and generalization, and ensuring that the action and transition model (namely, the model that can predict actions given states) favors actions with better scores. One of ordinary skill in the art would appreciate that the functional capturing the goodness of alignment and generalization could be chosen to have the features taught in the co-pending patent application YOR8-2002-0579 "Alignment and generalization of demonstrated procedure traces".

In Step 201, an initial alignment is computed, namely, each input-output pair in each trace of the training set is associated with a probability distribution over the states. More generally, the term alignment in the spirit of the present invention denotes a correspondence between input-output pairs. In the exemplary aspect of the present invention described in FIG. 2, the correspondence is constructed by means of said probability distributions: in other words, the alignment between input-output pairs is obtained from the alignment between input-output pairs and states of the finite-state machine. Also in Step 201 aligned steps are generalized.

In Step 202 a transition model is inferred based on the aligned and generalized traces. This model is inferred in a way that transitions with better scores are favored.

In Step 203, an action model is inferred which favors predicting actions with better scores. In Step 204 a new alignment and generalization of the traces is computed, which is consistent with the transition and action models learned in Steps 202 and 203, and optimizes an alignment-and-generalization functional. In Step 205, the model produced by Steps 202, 203, and 204 is evaluated, and Step 205 detects whether the algorithm of FIG. 2 has converged to a solution. In a preferred exemplary aspect of the present invention, Step 205 compares the value of the alignment-and-generalization functional computed during the current iteration with the value computed during the previous iteration, and the ability of the model to favor actions with high scores. If there is little or no change in the value of the alignment-and-generalization functional, and the model favors actions with high scores, Step 205 declares convergence, in which case the algorithm terminates at Step 206, otherwise another iteration is performed starting from Step 202. One of ordinary skill in the art would appreciate and understand how to use one of the methods taught in the art for deciding that there is little or no change in the value of the alignment-and-generalization functional.

An exemplary method for deciding whether the model favors actions with high scores according to the spirit of the present invention is the following: for each group of aligned input-output pairs that are similar according to a predefined metric, Step 205 computes the scores of the predicted outputs, namely, the outputs produced by the model constructed in Step 203, and their average v. Step 205 also considers the observed outputs, namely, the outputs in the training set, and computes the average μ and the standard deviation σ. If s is equal to 0, the group of aligned input-output pairs is ignored by Step 205. Otherwise, Step 205 computes γ=(v−μ)/σ, the difference between the average score of the predicted outputs and the average score of the observed outputs normalized by the standard deviation of the scores of the observed outputs. Step 205 then averages the value of γ over all groups of aligned steps that are not ignored (i.e., those groups with σ strictly greater than 0). If the value of the average of γ is greater than a threshold τ, Step 205 declares that the model created by Steps 202 to 204 favors actions and transitions with higher score. The threshold a can be selected by the user, automatically set a-priori, or can be an adaptive quantity that changes with each iteration over Steps 202 to 204. One of ordinary skill in the art would appreciate how other embodiments of Step 205 exist and are in accordance with the spirit of the present invention.

One of ordinary skill in the art would appreciate that the method described in FIG. 2 cannot be reduced in any obvious way to the model described in FIG. 1 of the co-pending patent application YOR8-2002-0579 "Alignment and generalization of demonstrated procedure traces." The method described in FIG. 1 of YOR8-2002-0579 strictly relies on an alignment-and-generalization functional. In particular, it has no provision for creating action models that favor actions and transitions with better values of the score (e.g., as in Steps 202 and 203 of the exemplary aspects of the present invention) nor for detecting convergence based on both an alignment-and-generalization functional and an evaluation of the ability to produce actions with high scores (e.g., as in Step 205 of the exemplary aspects of the present invention).

An exemplary, preferred aspect of the present invention is now described in detail, where the procedure model is based on IOHMM. According to the exemplary aspects of the invention, one can interpret the log-likelihood of the training data as the goodness-of-alignment-and-generalization functional.

However, the Baum-Welch algorithm (for example, as disclosed by Y. Bengio and P. Frasconi, "Input-Output HMM's for Sequence Processing", IEEE Trans. Neural Networks, 7(5):1231-1249, September 1996) does not account for the scores, namely, it does not produce a predictive model that favors actions with better scores, nor use the ability to produce actions with high scores as part of the criterion for declaring convergence. The exemplary aspects of the present invention teach a way of modifying the Baum-Welch algorithm to overcome these limitations. Step 205 of FIG. 3 can be applied as described to the Baum-Welch algorithm to ensure that the criterion for declaring convergence relies on both the goodness-of-alignment-and-generalization functional and on the ability to produce actions with high scores.

Assume, for example, without loss of generality, that scores are non-negative numbers. If the scores produced by the scoring functions can assume negative values, one can always transform them to non-negative numbers by means of an appropriate monotonically increasing function, such as $\exp(x)$ or $\arctan(x)+\pi/2$ Under this assumption, a preferred exemplary aspect of Step 204 of the present invention is the following. Let $f_t$ be the score of the trace input-output pair at time t, computed by applying the function f to the states before and after the action executed at time t. In a preferred exemplary aspect of the present invention, the training section of the action classifier for node n contains the state-action pair (s,a) at time t with weight equal to $f_t p_t(n)$. The assumption that $f_t$ is non-negative ensures that the product $f_t p_t(n)$ is non-negative, and therefore a valid weight. Hence, input-output pairs with small score have smaller weight in the construction of the classifier than input-output pairs with higher score and comparable alignment probability $p_t(n)$. This in turn implies that the node classifier will tend to predict actions with higher score.

One of ordinary skill in the art would appreciate how an analogous aspect of Step 203 can be constructed using the same approach.

In the spirit of the exemplary aspects of the present invention where one of steps 203 and 204 is constructed as described above and the other as described in Y. Bengio and P. Frasconi, "Input-Output HMM's for Sequence Processing", IEEE Trans. Neural Networks, 7(5):1231-1249, September 1996, are also possible.

Figure 3:
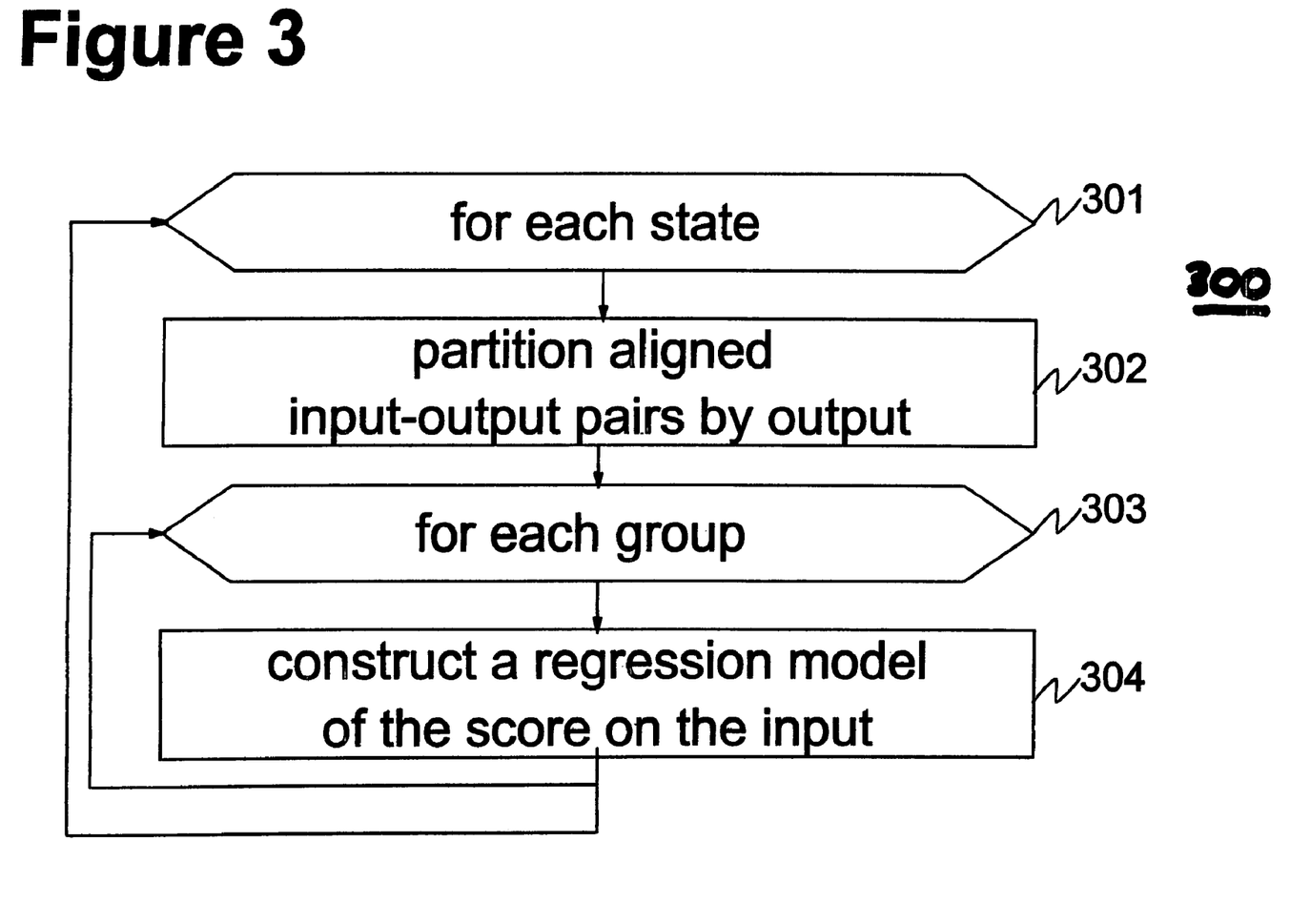
FIG. 3 teaches an exemplary method 300 for inducing the action model of the executable and distributable model from a collection of traces.

FIG. 3 describe another preferred exemplary aspect of the present invention for constructing the conditional action model given the state. Step 301 iterates over the states. Let s be the state selected in Step 301. In Step 302 the input-output pairs aligned with the state s (namely, those for which the associated probability distribution over the set of states assigns non-zero probability to s) are partitioned in groups having the same output. Step 303 iterates over each group produced by Step 302. Step 304 creates a regression model $g_o^s$ of the scores on the inputs using the scored input-output pairs in the group selected by Step 303, where o denotes the output associated with the group, and s denotes the state. Creating a regression model is taught in the art, for example, in T. Hastie, R. Tibshirani, and J. Friedman, "The Elements of Statistical Learning", Springer-Verlag, New York, 2001. Said regression model should have the feature of associating small scores to all inputs that are sufficiently different from any input belonging to the data in said group, where difference is defined according to an appropriate distance function. In a preferred exemplary aspect, this distance function is provided by the user.

All the regression models created by Step 304 during a single iteration of Step 301 are associated with the state s and combined to create the conditional output model for the state s. More specifically, during prediction, these models are combined as follows: let $x^{(t)}_{input}$ the observed input at time t, and let $\pi_t$ be the updated distribution over the states as described in the related art. For each output o, compute $$\Phi(o) = \Sigma_{s \in S} \pi_t(s) g_o^s(x^{(t)}_{input}),$$

namely, the expected value of the regressed value of the score on the input, computed using the updated distribution $m_t$. In a preferred exemplary aspect, the method selects the output o* having the largest value of $\Phi()$. In another exemplary aspect, the outputs are sorted by their values of $\Phi()$ and presented to the user together with their score, thus allowing the user to select the next output.

It would be evident to one of ordinary skill in the art how the exemplary method taught in FIG. 3 can be extended to construct a transition model in Step 202.

Figure 4:
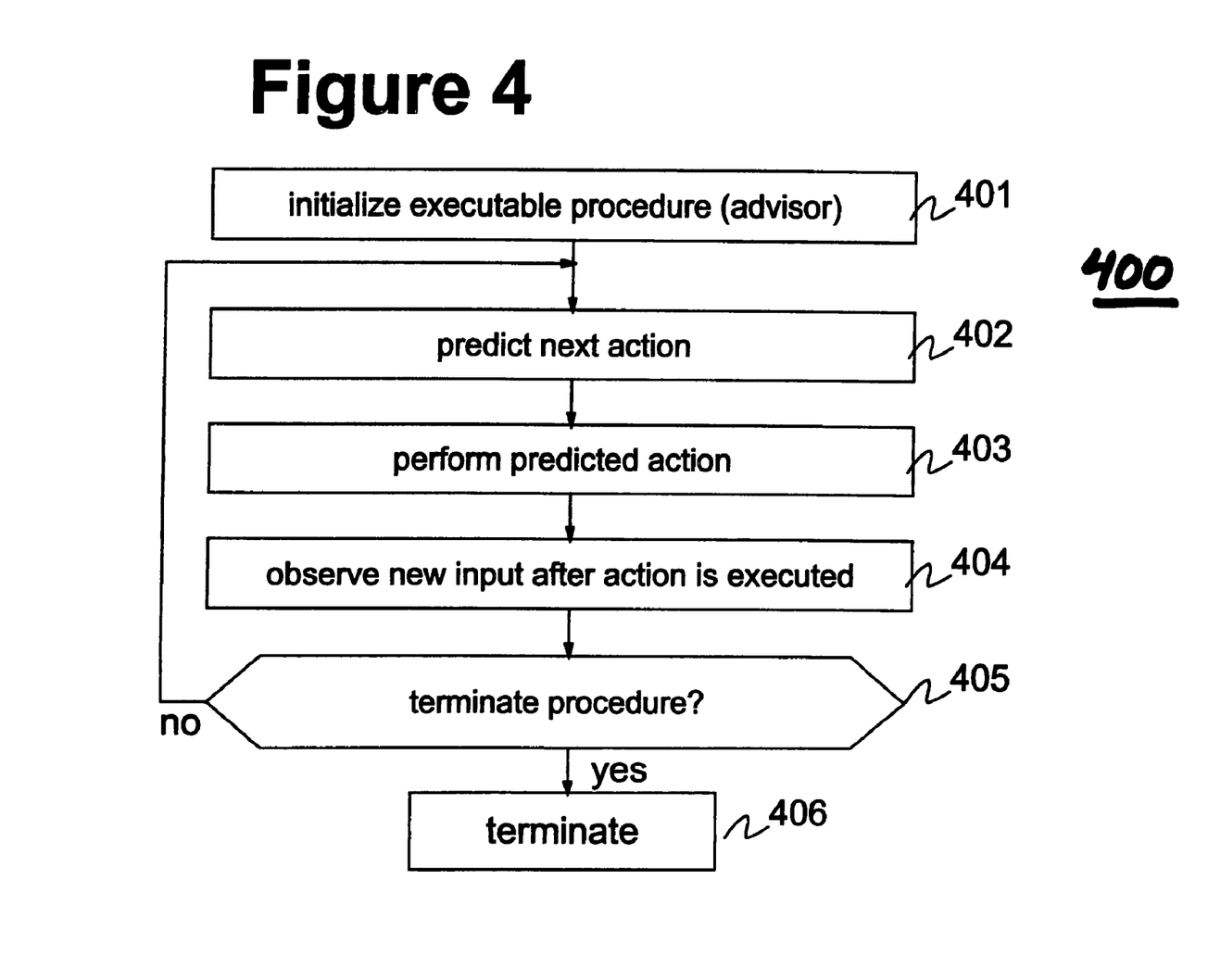
FIG. 4 teaches an exemplary method 400 for executing the executable and distributable procedure models.

FIG. 4 describes a preferred exemplary aspect of the invention for automatically executing the inferred procedure model. In Step 401 the learned executable procedure model is initialized. Initialization can contain steps such as retrieving the executable procedure model from a repository of executable procedure model, initializing relevant variables, and computing the representation of the initial state. In step 402, an input is observed and provided to the executable procedure model, which is used to predict an action to be taken (i.e., the output). The predicted action is executed in Step 403, and its effects on the system, described by a new input observed in Step 405, are evaluated in Step 405. More specifically, in Step 405 the executable procedure decides whether to terminate its execution or to continue, using information on the predicted actions and the state of the system. If the executable procedure decides to terminate the execution, it proceeds to Step 406, otherwise it continues from Step 402, using the input observed in Step 404.

Figure 5:
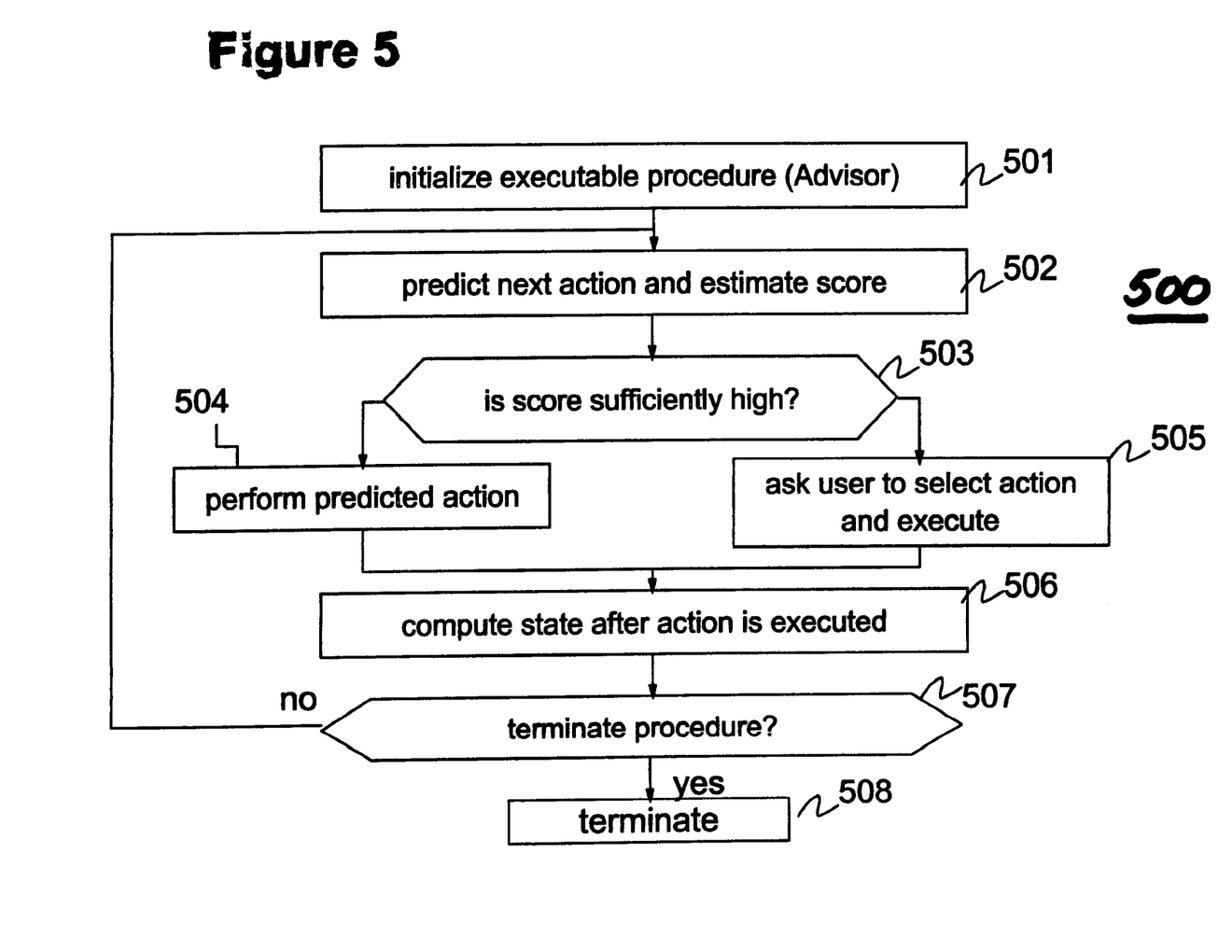
FIG. 5 teaches an exemplary method 500 for executing the executable and distributable procedures while interacting with the user whenever the predicted action has a score that is too low.

FIG. 5 describes another preferred exemplary aspect for automatically executing the learned procedure. Steps 501 is analogous to Steps 401 of FIG. 4. In Step 502, the executable procedure predicts an action to be performed and produces a score for the action. For example, the produced score could be the score associated with the action in the training set. In Step 503 the score is analyzed. If the score is sufficiently high, for example, if the score is higher than a predefined threshold selected by an expert, the action is performed in Step 504. Otherwise, in Step 505 the algorithm provides the user with information on the current state of the system, on the performed actions, and on the predicted action, and asks the user to select an action. The system performs the action selected by the user. Steps 506, 507, and 508 are respectively analogous to Steps 404, 405, and 406 of FIG. 4.

Figure 6:
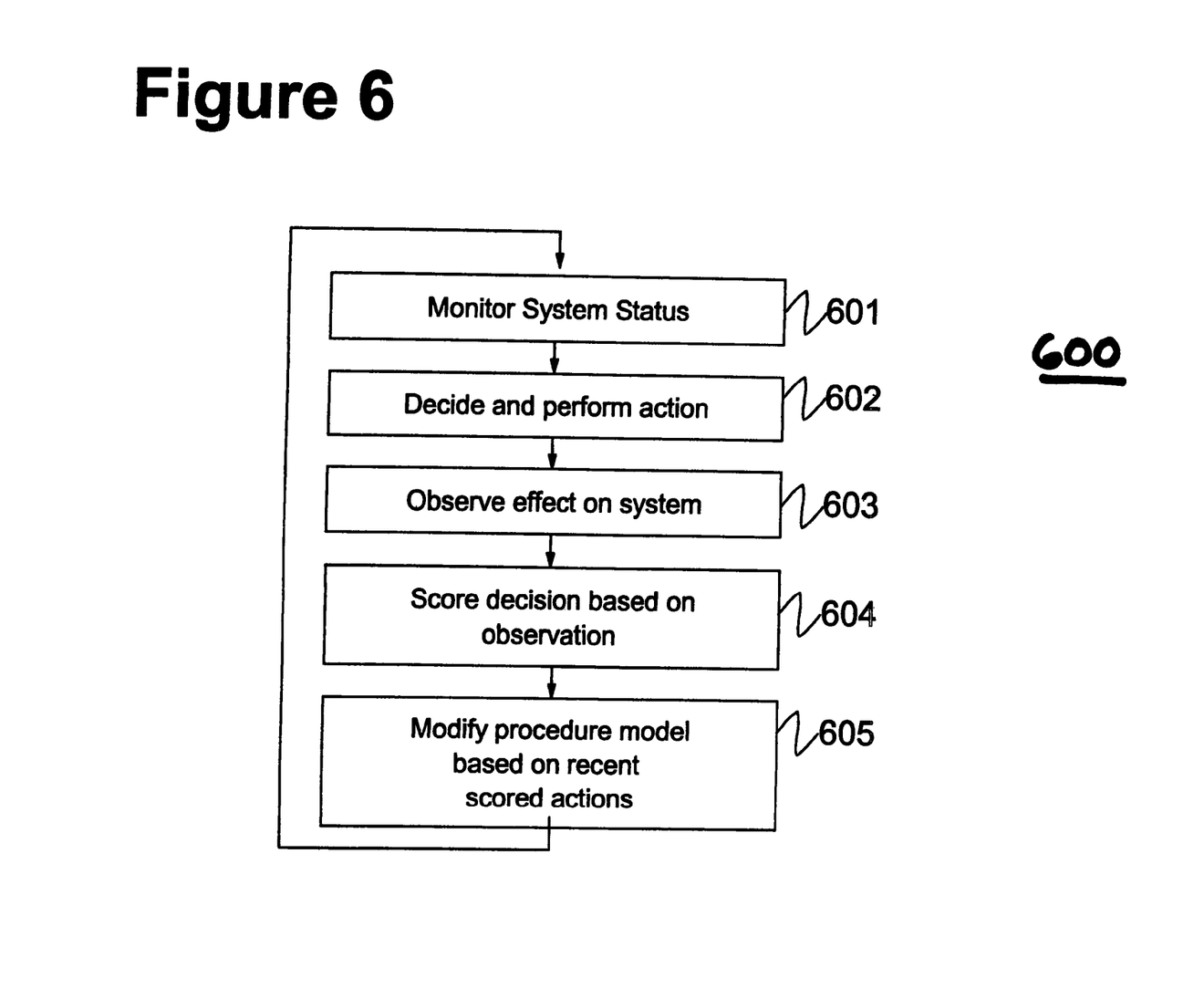
FIG. 6 teaches an exemplary method 600 for simultaneous execution and induction of executable procedure model, for constructing adaptive autonomic agents.

FIG. 6 describes a preferred exemplary aspect of the present invention as part of a self-modifying autonomic advisor/agent. In this aspect, the autonomic agent operates according to a user-specified policy, whose specification includes a user-selected scoring function. The agent also contains an executable procedure model constructed, for example, as described in FIG. 2. Said advisor in Step 601 monitors the status of the system it operates on, and, if necessary, in Step 602 selects an action, as described above, and executes said selected action. In Step 603, the agent observes the effects of the executed action on the system, and in Step 604 uses the user-specified scoring function to score the action. In Step 605, the agent modifies the procedure model based on recent scored actions. In a preferred embodiment, Step 605 further consists of the steps of deciding when to modify the procedure model based on recent scored action, and inducing a new procedure model using all available scored traces. For example, in Step 605 the agent would decide whether the recent sequence of actions corresponds to a full execution of the procedure embodied in the agent, in which case the agent would induce a new procedure model, for example, as described in FIG. 2; or if the recent sequence of action corresponds to a partial execution of the procedure, in which case the agent would wait until the procedure is completed. One of ordinary skill in the art would appreciate how step 604 can be implemented to embody one or more of the methods for scoring traces described in this patent.

The methods of the present invention can be extended to fuzzy actions (namely, to fuzzy membership functions on the set of possible actions). In a preferred exemplary aspect, Step 302 of FIG. 2 is modified to partition aligned input-output pairs by fuzzy set rather than by individual actions. The score is then assigned to fuzzy sets rather than to individual action.

The exemplary methods of the present inventions can be extended to produce both scores and posterior probabilities of actions. In a preferred exemplary aspect this is accomplished by constructing, in Step 203, a predictive action model for each state that does not use scores, for example, as described in Ser. No. 10/729,736, entitled "Alignment and Generalization of Demonstrated Procedure Traces" and filed Dec. 5, 2003, as well as an action model. Then, when predicting the next output (action) (e.g., in Step 402 of FIG. 4), the output is computed as described above, and the posterior distribution of the outputs is simultaneously computed as described, for example, in Ser. No. 10/729,736, entitled "Alignment and Generalization of Demonstrated Procedure Traces" and filed Dec. 5, 2003. Then, the outputs can be displayed with scores and posteriors.

One of ordinary skill in the art would appreciate how to produce both scores and confidences by appropriately modifying the exemplary method just described. The simplest case is that in which a confidence level is a function of the posterior distributions on the outputs, in which case the previous method can be adapted in an obvious way.

Figures 7, 8:
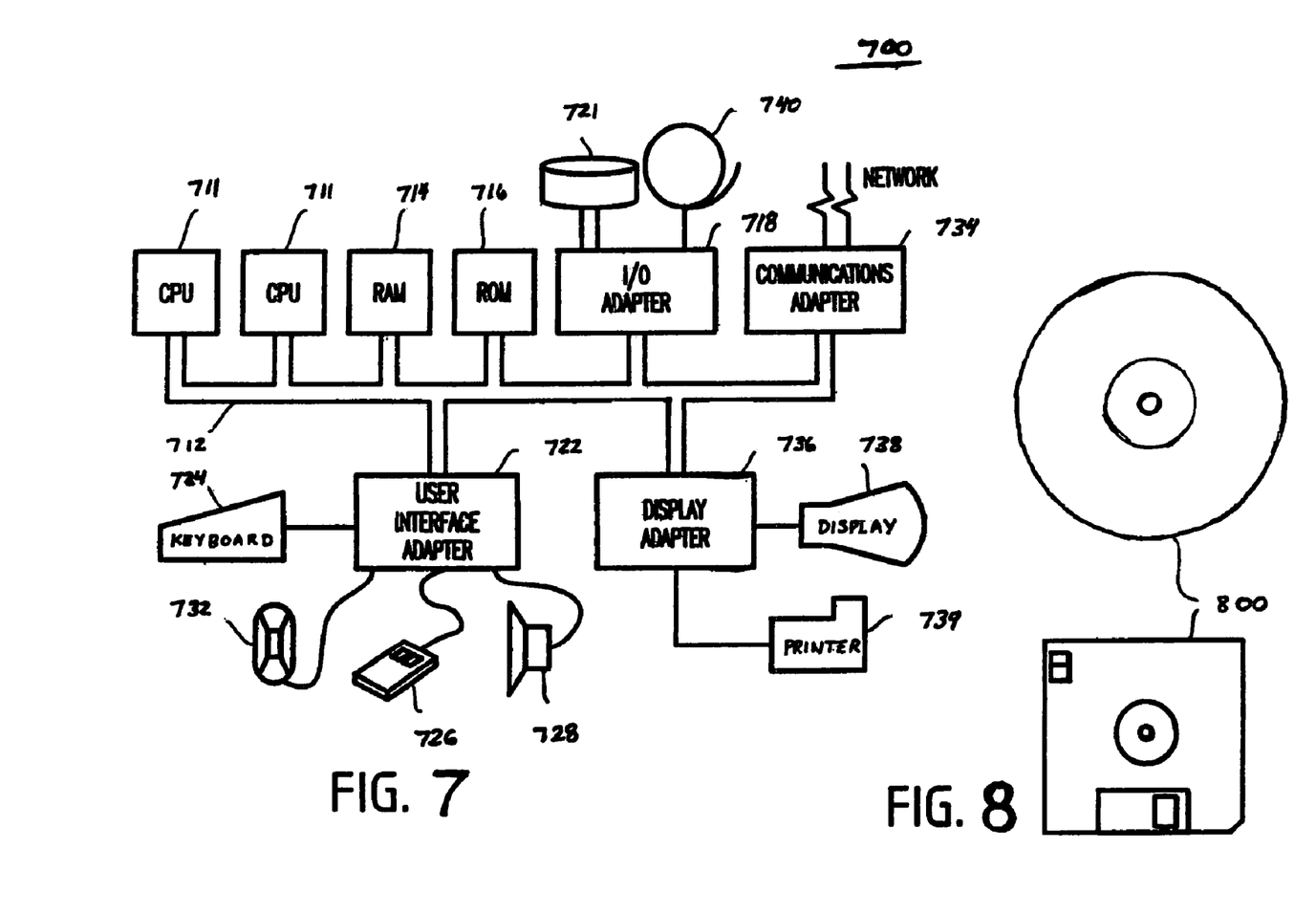
FIG. 7 illustrates an exemplary hardware/information handling system 700 for incorporating the present invention therein.
FIG. 8 illustrates a signal bearing medium 800 (e.g., storage medium) for storing steps of a program of a method according to the present invention.

FIG. 7 illustrates a typical hardware configuration of an information handling/computer system for use with the invention and which preferably has at least one processor or central processing unit (CPU) 711.

The CPUs 711 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface device to the bus 712), a communication adapter 734 for connecting an information handling system to a data processing network, the Internet, an Intranet, a personal area network (PAN), etc., and a display adapter 736 for connecting the bus 712 to a display device 738 and/or printer.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

This signal-bearing media may include, for example, a RAM contained within the CPU 711, as represented by the fast-access storage for example. Alternatively, the instructions may be contained in another signal-bearing media, such as a magnetic data storage or CD-ROM diskette 800 (FIG. 8), directly or indirectly accessible by the CPU 711.

Whether contained in the diskette 800, the computer/CPU 711, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

Additionally, in yet another aspect of the present invention, it should be readily recognized by one of ordinary skill in the art, after taking the present discussion as a whole, that the present invention can serve as a basis for a number of business or service activities. All of the potential service-related activities are intended as being covered by the present invention.

While the invention has been described in terms of several exemplary embodiments, those skilled in the art will recognize that the invention can be practiced with modification within the spirit and scope of the appended claims.

Further, it is noted that, Applicant's intent is to encompass equivalents of all claim elements, even if amended later during prosecution.

What is claimed is:

1. A computerized method of constructing an executable reusable procedure, said method comprising:
    loading at least one scored trace of a procedure into a memory, said scored trace comprising a recorded sequence of state-action pairs during an execution of said procedure, a scoring of said scored trace comprising an indication of how much a procedural action changes a state of the system as progressing towards a goal of said procedure; and
    determining, using a processor, an executable procedure from one or more of said at least one scored trace of said procedure execution.

2. The method according to claim 1, wherein said executable procedure selectively favors actions with a higher score.

3. The method according to claim 1, further comprising:
    obtaining said at least one scored trace of said procedure execution,
    wherein said obtaining said at least one scored trace comprises:
        automatically observing at least one of a procedure execution and at least one instance of a procedure execution,
        wherein said automatically observing is performed prior to automatically aligning said observed executions of procedures, and
        wherein said automatically aligning said observed executions of procedures is performed prior to automatically producing executable procedure.

4. The method according to claim 3, wherein said automatically observing said at least one procedure execution comprises:
    automatically observing at least one expert executing instances of said procedure execution; and
    providing each expert of said at least one expert with means for annotating individual steps of said instance of said procedure execution.

5. The method according to claim 1, further comprising:
    obtaining said at least one scored trace of said procedure execution,
    wherein said obtaining comprises:
        recording at least one trace; and
        scoring said at least one trace based on a scoring function to determine said at least one scored trace.

6. The method according to claim 1, further comprising:
    creating a library of a plurality of reusable procedures.

7. The method according to claim 1, wherein said determining comprises:
    inducing a model from said at least one scored trace.

8. The method according to claim 7, wherein said model comprises:
    a stochastic finite-state Mealy machine model.

9. The method according to claim 7, wherein said inducing said model comprises an initialization phase comprising:
    computing an initial alignment and an initial generalization of said at least one trace;
    computing a transition model based on said initial alignment; and
    computing an action model for said initial alignment.

10. The method of claim 7, wherein said inducing said model comprises:
    inducing a best alignment for a given generalization and a best generalization for a given alignment.

11. The method of claim 10, wherein said inducing a best generalization for a given alignment comprises:
    computing a transition model based on said given alignment;
    computing an action model for said given alignment; and
    evaluating a capability of said best alignment and said best generalization to produce at least one action with a predetermined high score.

12. The method according to claim 10, wherein at least one of said transition model selectively favors transitions with a higher score and said action model selectively favors actions with a higher score.

13. The method according to claim 10, wherein said computing the action model comprises:
    for each state, partitioning aligned input-output pairs by output into groups;
    for each group, constructing a regression model of a score on inputs using scored input-output pairs.

14. The method according to claim 1, further comprising:
    initializing said executable procedure;
    predicting a next action based on said executable procedure;
    executing said predicted next action;
    evaluating an effect of said next action by observing a new input after said next action is executed; and
    determining whether to terminate said executable procedure based on said evaluation.

15. The method according to claim 1, further comprising:
    initializing said executable procedure;
    predicting a next action based on said executable procedure;
    estimating a score for said next action;

if said score is higher than a predetermined threshold, executing said next action;

if said score is not higher than said predetermined threshold, soliciting a user to select a user selected action and executing said user selected action;

evaluating an effect of said one of said next action and said user selected action by observing a new input after said one of said next action and said user selected action is executed; and determining whether to terminate said executable procedure based on said evaluation, wherein said soliciting said user to select said user selected action comprises:

providing said user with information on at least one of a current state of a system, actions previously performed, and predicted actions; and     asking said user to select said user selected action.

16. The method according to claim 1, further comprising:

monitoring a status of a system executing said executable procedure;

selecting an action and executing said selected action;

observing at least one effect of said executed action on the system;

scoring said action based on a user-specified scoring function;

modifying said procedure model based on at least one scored action;

determining whether to modify said procedure model based on a recent scored action; and inducing a new procedure model using at least a portion of available scored traces.

17. A method for deploying computing infrastructure in which computer-readable code is integrated into a computing system, and combines with said computing system to perform the method according to claim 1.

18. A computer-readable storage medium tangibly embodying a program of machine-readable instructions executable by a digital processing apparatus to perform the method of causing the construction of an executable reusable procedure, according to claim 1.

19. A computerized system for constructing an executable reusable procedure, comprising:

a memory for loading a scored trace of a procedure, said scored trace comprising a recorded sequence of state-action pairs during an execution of said procedure, a scoring of said scored trace comprising an indication of how much a procedural action changes a state of the system as progressing towards a goal of said procedure;

a processor-executed determining unit that selectively determines an executable procedure from said at least one scored trace of said procedure execution;

a processor-executed obtaining unit that selectively obtains said at least one scored trace of said procedure execution;

a processor-executed observing unit that selectively automatically observes at least one of a procedure execution and at least one expert executing said procedure;

a processor-executed aligning unit that selectively automatically aligns said observed executions of procedures; and     means for annotating individual steps of at least one instance of said executable procedure.

20. A system for constructing an executable reusable procedure, comprising:

a memory to store at least one scored trace of a procedure execution, said scored trace comprising a recorded sequence of state-action pairs during an execution of said procedure, a scoring of said scored trace comprising an indication of how much a procedural action changes a state of the system as progressing towards a goal of said procedure; and     means for determining an executable procedure from said at least one scored trace of said procedure execution, as executed by a processor.

* * * * *